United States Patent Office 2,869,364
Patented Jan. 20, 1959

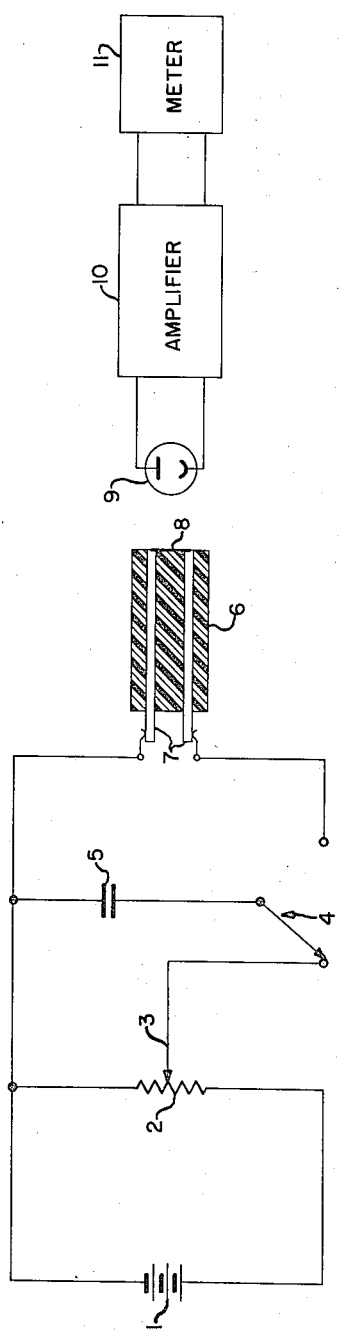

2,869,364

APPARATUS AND METHOD FOR NON-DESTRUCTIVE TESTING OF INITIATORS

Irving Kabik, Hyattsville, Md., and James N. Ayres, Washington, D. C., assignors to the United States of America as represented by the Secretary of the Navy Application January 27, 1953, Serial No. 333,628

3 Claims. (Cl. 73—167)

(Granted under Title 35, U. S. Code (1952), sec. 266)

The invention described herein may be manufactured and used by or for the Government of the United States of America for governmental purposes without the payment of any royalties thereon or therefore.

This invention relates to a means for testing electric primers and detonators and more particularly to a method and apparatus for the non-destructive testing of initiators by which the energy required to fire an initiator may be accurately determined.

Heretofore, in determining the sensitivity of primers and detonators, it has been the practice to select samples from a group and actually fire the samples to establish the sensitivity. Statistical prediction was then applied to select a probable firing sensitivity for the group of primers. Such a system is not sufficiently accurate unless a very large number of primers or detonators are made to fire and are thereby destroyed by the testing.

The present invention contemplates the provision of an apparatus and method for testing initiators by means of which each primer may be individually tested non-destructively and the required firing energy may be accurately predicted. There is provided a potential source which is connected to the electric primer or detonator. A surge of current is passed therethrough and the electrically conductive path within the initiator is heated thereby. The amount of radiant energy produced by the initiator provides an accurate measure of the sensitivity, the hotter initiators being the more sensitive and consequently requiring less firing energy. The radiated energy is measured by any suitable means such, for example, as a photoconductive cell and the current produced in the cell is measured by means of any indicating instrument such, for example, as a peak voltmeter or a cathode ray oscillograph. As previously pointed out, the reading of the indicating instrument provides an accurate measure of the firing sensitivity. It can be seen that by virtue of the method herein disclosed primers and detonators may be sorted according to their firing sensitivity with an accuracy not possible heretofore. The advantages derived from such a determination are of considerable importance in that the primers may be more efficiently used for operational requirements involving varying amounts of firing energy.

An object of this invention is to provide a non-destructive method and apparatus for testing detonators and primers by means of which the firing sensitivity of each initiator may be accurately determined.

A further object of this invention is to provide a method for testing electric initiators in which the conductive path of the initiator is caused to be heated and the correlation between the amount of energy radiated and the firing sensitivity is utilized in determining the firing sensitivity.

Still another object of the present invention is the provision of a method and apparatus for determining the firing sensitivity of primers and detonators in which a surge of current is caused to flow through the conductive path of the initiator which is heated thereby, the radiated energy causing a current flow in a radiant energy responsive device, such as a photoconductive cell to provide an accurate measure of the firing sensitivity.

Other objects and many of the attendant advantages of this invention will be readily apreciated as the same becomes better understood by reference to the following detailed description when considered ni connection with the accompanying drawing wherein:

The figure shown is a block circuit diagram of an apparatus constructed in accordance with the present invention.

There is shown at 1 a suitable source of electrical energy which is connected to the resistor 2 of a potentiometer. The sliding contact 3 of this potentiometer is connected to a pole of a single pole double throw switch 4. The switch 4 is connected to a condenser 5 so that the condenser may be charged through the potentiometer by the source 1 with the switch in the position shown.

There is shown at 6 a primer or initiator of a well known variety having electrodes 7 extending therethrough. Across the ends of these electrodes is disposed a conducting bridge which may be a wire 8. In the normal operation of the initiator an explosive charge is disposed on the end portion of the initiator and a surge of current is passed through the conducting bridge. The heat emitted by this bridge causes detonation of the explosive charge. It is obvious that the amount of energy required to heat the bridge must be determined accurately in order to provide a suitable firing circuit.

There is shown at 9 a photo electric cell which may, for example, be of the lead sulphide type. It is apparent that other varieties of cells responsive to a relatively wide range of radiant energy wave lengths including the infra red range may be employed herein. Such cells as a photo-multiplier, vacuum or gas type photo-emissive cell could be used with equal success. The signal produced by the tube 9 is fed into an amplifier 10 of any well known construction and a meter 11 which may be a peak holding voltmeter is employed for indicating the strength of the amplified signal.

The operation of the presently disclosed apparatus and method is as follows. The potentiometer slider 3 is positioned to give the desired voltage output and the condenser 5 is charged with the switch 4 in the position shown. The switch 4 is then shifted so that the condenser discharges through the conductive path of the primer 6. The conducting bridge 8 is heated thereby and the radiant energy causes tube 9 to be conductive. This signal is amplified and measured in a well known manner by amplifier 10 and meter 11 respectively. The amount of energy radiated by the bridge wire provides an accurate index to the firing sensitivity of the primer. It can be seen that, the hotter the conducting bridge becomes in response to a given energy impulse, the greater is its firing sensitivity.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A method for non-destructive testing of an initiator whereby the firing energy may be determined comprising the steps of applying a short duration electrical impulse of an energy level below that normally required for firing and measuring the radiant energy produced thereby whereby an accurate index of the energy level required for firing the initiator is obtained.

2. An apparatus for the non-destructive testing of initiators comprising, in combination, a circuit including a source of electrical energy, a potentiometer connected across said source, a condenser in said circuit chargeable by said source through said potentiometer to a charge level below that normally required for firing the initiator to be tested, means for connecting an initiator across said condenser whereby a discharge path is formed through the initiator, and means spatially displaced relative to the connected initiator for detecting and indicating the magnitude of the energy radiated by the conductive path of the initiator.

3. An apparatus for determining the firing sensitivity of an initiator comprising, in combination, a circuit including a source of electrical energy, a condenser chargeable to a charge level below that normally required for initiator ignition by said source, an initiator forming a discharge path for the condenser, the initiator having a conducting bridge, the conductng bridge radiating energy in response to the discharge of said condenser therethrough, and means including a photoelectric cell spatially displaced relative to said initiator and responsive to the radiated energy therefrom for producing a signal correlative of the firing sensitivity of the initiator.

References Cited in the file of this patent
UNITED STATES PATENTS

| | | |
|---|---|---|
| 1,755,023 | Ruhlemann | Apr. 15, 1930 |
| 2,011,315 | Gilbert | Aug. 13, 1935 |
| 2,081,839 | Rankin | May 25, 1937 |
| 2,366,285 | Percy et al. | Jan. 2, 1945 |
| 2,543,754 | Beach | Mar. 6, 1951 |
| 2,577,815 | Saunderson et al. | Dec. 11, 1951 |
| 2,648,253 | Sweet | Aug. 11, 1953 |
| 2,652,743 | Morrow | Sept. 22, 1953 |
| 2,708,877 | Smits | May 24, 1955 |
| 2,749,510 | Rively | June 5, 1956 |